(12) United States Patent
Glaza

(10) Patent No.: US 11,524,521 B2
(45) Date of Patent: Dec. 13, 2022

(54) GLASS MIXING PALETTE AND MAGNETIC ATTACHMENT

(71) Applicant: Regina Marie Glaza, Fort Wayne, IN (US)

(72) Inventor: Regina Marie Glaza, Fort Wayne, IN (US)

( * ) Notice: Subject to any disclaimer, the term of this patent is extended or adjusted under 35 U.S.C. 154(b) by 107 days.

(21) Appl. No.: 16/808,541

(22) Filed: Mar. 4, 2020

(65) Prior Publication Data
US 2020/0384798 A1 Dec. 10, 2020

Related U.S. Application Data

(60) Provisional application No. 62/857,822, filed on Jun. 6, 2019.

(51) Int. Cl.
*B44D 3/02* (2006.01)
*B44D 3/04* (2006.01)
*C03C 17/00* (2006.01)

(52) U.S. Cl.
CPC ............... *B44D 3/02* (2013.01); *B44D 3/04* (2013.01); *C03C 17/002* (2013.01)

(58) Field of Classification Search
CPC .................................. B44D 3/02; B44D 3/04
USPC ............................................................ 206/1.8
See application file for complete search history.

(56) References Cited

U.S. PATENT DOCUMENTS

| | | | | |
|---|---|---|---|---|
| 2,137,477 A * | 11/1938 | De Haven | ................ | B44D 3/02 D7/544 |
| 2008/0156667 A1* | 7/2008 | Huggins | .................. | B44D 3/02 248/163.1 |
| 2010/0046209 A1* | 2/2010 | Helenowski | ........... | A45D 42/02 206/385 |
| 2016/0075173 A1* | 3/2016 | Hutton | .................... | B44D 3/02 206/1.7 |

OTHER PUBLICATIONS

Mijello Bulletproof Glass 38 Palette for Watercolor #MWP-3038; www.mijelloart.com/platinum-bulletproof-glass-38-palette-for-watercolor.html; downloaded Feb. 26, 2020.

* cited by examiner

*Primary Examiner* — Steven A. Reynolds

(57) ABSTRACT

A closable portable painting palette case has a glass paint mixing surface with a glazed or color backing. The glazed or color backing uses an automotive process that may include an adhesion promoter, a color application, an opaque base coat application, and a clear coat application. The glass paint mixing surface may be a shatter-resistant glass with a wrong or rough side and a right or smooth side, so that the glazed or color backing is applied to the wrong or rough side, leaving the right or smooth side for use in mixing paint smears. The glazing or color backing may be white, silver, or gray, depending on the application. A magnetic attachment may be provided for attaching the palette to a sketchbook or watercolor book for hands-free use. Molded or magnetic paint pans may be provided in the closable portable painting palette.

15 Claims, 10 Drawing Sheets
(10 of 10 Drawing Sheet(s) Filed in Color)

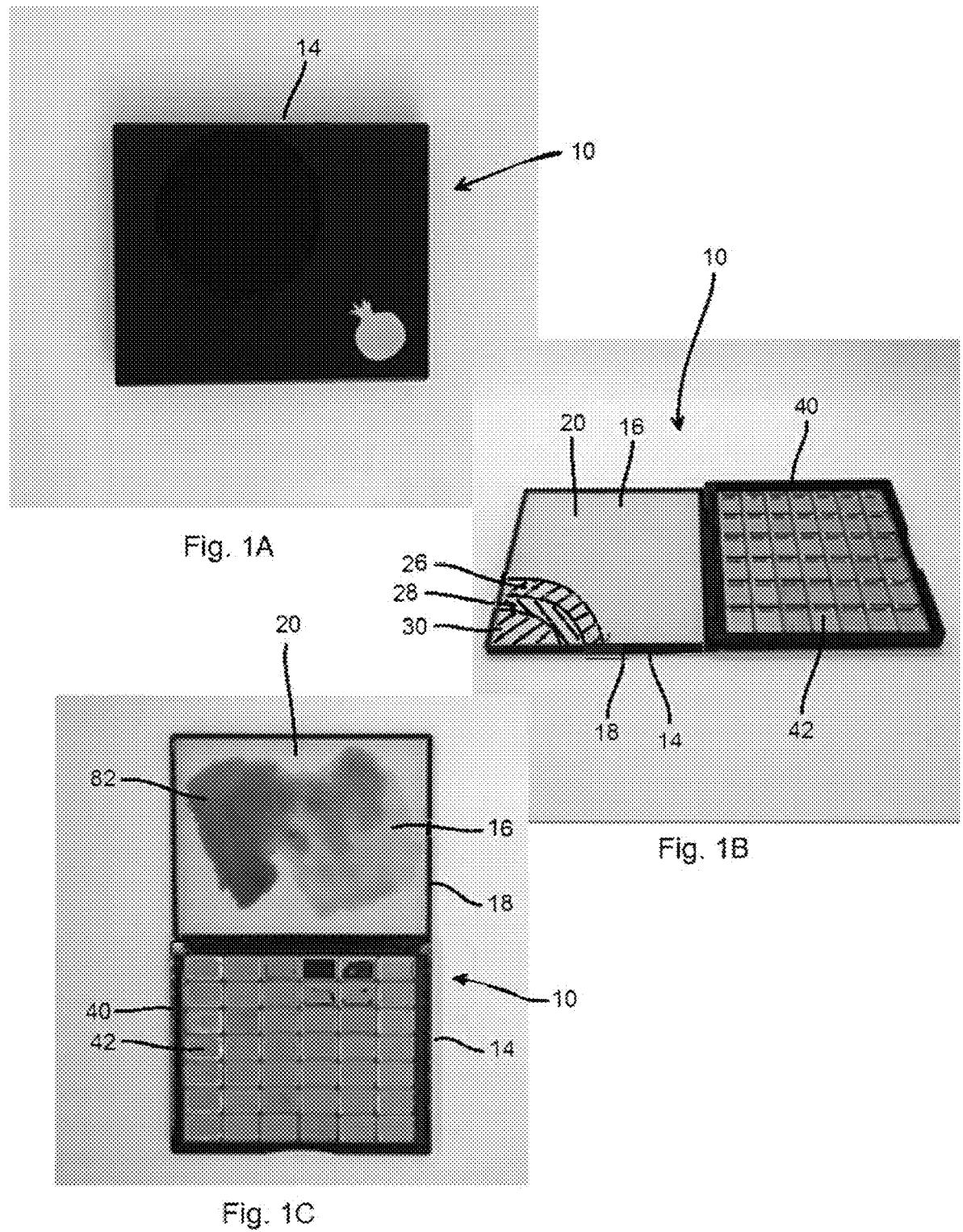

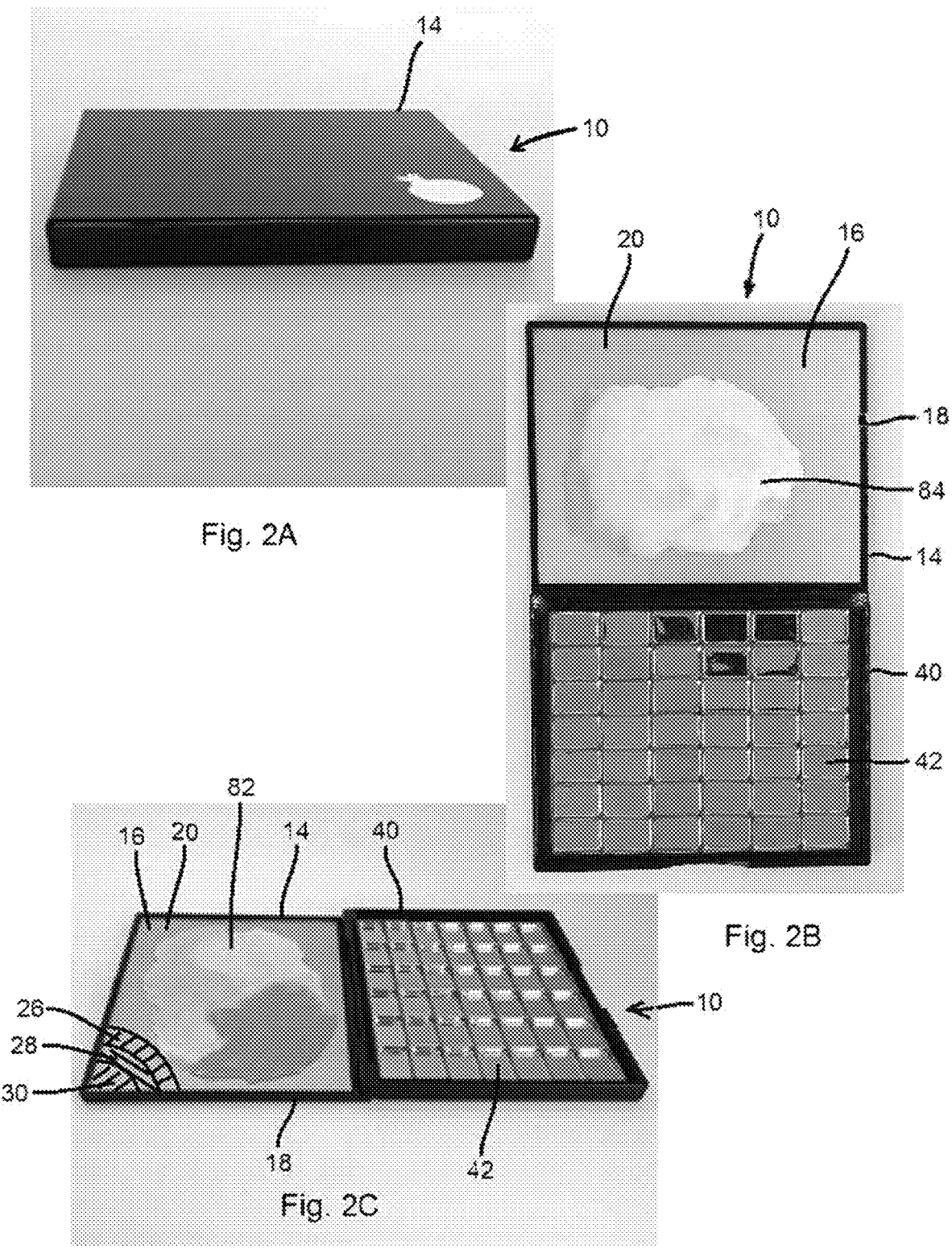

GLASS MIXING PALETTE AND MAGNETIC ATTACHMENT

CROSS-REFERENCE TO RELATED APPLICATIONS

The present application claims priority to U.S. Provisional No. 62/857,822, filed Jun. 5, 2019, the entire contents of all of which are herein incorporated by reference.

BACKGROUND

Field of Invention

Embodiments described herein generally relate to a Glass Mixing Palette and Magnetic Attachment. Embodiments of the Glass Mixing Palette and Magnetic Attachment provide opaque glass paint mixing surfaces made from a glass pane having a glazed or color backing. Embodiments of the Glass Mixing Palette and Magnetic Attachment may further take the form of a closable palette box, case, or tin, and may be provided with a magnetic attachment assembly, so that the closable palette box, case, or tin may be attached to the pages of a sketchbook or watercolor journal.

Related Art

Watercolor and gouache palettes are typically made from plastic or metal and are not ready for mixing colors as the watery pigments tend to bead on the smooth surface. Artists, therefore, spend much time breaking in the mixing area of their palettes by sanding, scrubbing with toothpaste, or smearing paint on the surface, often for weeks or more before the mixing area of the palette will stop beading and allow for a smooth paint smear that will allow the artist to see their paint colors clearly. Watercolor artists, in particular, traditionally use a ceramic or porcelain palette in the studio for optimal paint smears. However, these are not travel friendly or sturdy.

Many artists, especially those that work in watercolor or gouache paints, like to have portable palettes with which to paint when travelling. There are many styles of paint palettes that can fold up and travel, but none of them have a glass mixing surface. Glass is an ideal mixing surface for these mediums, but no travel palette includes a true glass surface. Metal and plastic do not mix as well as true glass. Therefore, other palettes must be broken in or manipulated with sanding or other applications to prevent paint beading.

The Martin F. Weber Company, located at 2727 Southampton Road, Philadelphia, Pa. 19154, under the brand name Mijello™, sells a palette, which it refers to as the "Platinum Bulletproof Glass 38 Palette for Watercolor," model number MWP-3038 (formerly MWP-3036). (http://www.mijelloart.com/platinum-bulletproof-glass-38-palette-for-watercolor.html). However, upon acquiring an example of the MWP-3036 model palette, the inventor observes that the palette is not made of glass. Rather, the MWP-3036 palette (and its replacement MWP-3038 as it appears on the website) is molded from a durable plastic, likely polycarbonate plastic, including the mixing surface. This accounts for the name "Bulletproof Glass," as polycarbonate is used as a laminate in the manufacture of actual bulletproof glass, either as an anti-spalling medium on the inside surface of actual bulletproof glass, and/or as a tough capture medium between layers of glass in actual bulletproof glass. Therefore, the use of the name "Bulletproof Glass" as a marketing ploy does not actually contemplate the use of true glass in a travel palette.

Furthermore, when painting on location, an artist must find a way to hold his or her palette, sketchbook, and brush. When a table or other surface is not available, the artist must balance these items on his or her lap, while keeping one hand free to manipulate the paintbrush. This becomes more difficult if the artist is also utilizing a water dish. Known travel palettes do not provide ready to mix surfaces for paint in a convenient travel size, nor do they provide an attachment to attach the palette to a sketchbook in a way that does not damage the paper.

Accordingly, there is an unmet need for a portable palette having a ready to use ideal mixing surface that is convenient in size and readily attachable to a sketchbook, in order to leave the artist's hands free for painting.

SUMMARY

Embodiments described herein relate to a Glass Mixing Palette and Magnetic Attachment. The Glass Mixing Palette and Magnetic Attachment in at least one embodiment is a palette in a closable portable case having an opaque glass paint mixing surface that allows artists to prepare their watercolor or gouache smears for optimum color and transparency visualization. The glass paint mixing surface may actually be clear glass rendered opaque by a glazed or color backing that can be adjusted to produce a desired effect. Specifically, and for non-limiting example, a glass paint mixing surface rendered opaque by a white glazed or color backing is ideal for watercolor. For further non-limiting example, a glass paint mixing surface rendered opaque by a grey glazed or color backing is ideal for gouache. The glass used may be common plate glass. Alternatively, a shatter-resistant glass similar to the glass screens used on cell phones may be used. Examples of such shatter-resistant glass may include, for non-limiting example, alkali-aluminosilicate sheet glasses such as Gorilla Glass® manufactured by Corning®, located at One Riverfront Plaza, Corning, N.Y. 14831, Dragontrail® manufactured by AGC Inc., located at 1-5-1, Marunouchi, Chiyoda-ku, Tokyo 100-8405, Japan, and Xensation® manufactured by Schott AG, located at 5530 Shepherdsville Road, Louisville, Ky. 40228. The strength and thinness of such shatter-resistant glass makes its use ideal for the present application.

The glazed or color backing of the glass paint mixing surface of embodiments of the Glass Mixing Palette and Magnetic Attachment may be applied using an automotive paint process. The automotive paint process used may include application of an adhesion promoter, followed by application of the color, followed by application of an opaque base coat, followed by application of a clear coat. Automotive paint used in conjunction with adhesion promoter in this way provides consistent results, whereas other paints will separate from the glass and peel. It is noted that there is a wrong or rough side, and a right or smooth side, to glass of this type. Specifically, during manufacturing common plate glass develops a rough side that will not allow water to smear smoothly over its surface. Instead, water applied to the wrong or rough side tends to bead up. It is this wrong or rough side, then, to which the glazed or color backing of embodiments of the Glass Mixing Palette and Magnetic Attachment is applied.

In order to determine the wrong or rough side of the glass paint mixing surface if it becomes in question during the manufacturing process, a smear test may be used. Using a paint brush, colored water is applied to the glass on one side and then on the other side. If both sides of the glass exhibit beading of the colored water, it is probable that a residue from the manufacturing process is present on the glass. If so, then the residue must be cleaned off with water and/or detergent using a soft cloth, applied in a manner so as to cause tension when rubbing the glass. Thereafter, the colored water may again be applied to the glass on one side and then on the other side. This test will result in the wrong or rough side exhibiting significantly greater beading of the colored water, while the right or smooth side will produce an even smear.

Alternatively, the glass paint mixing surface of other embodiments of the Glass Mixing Palette and Magnetic Attachment may also be rendered opaque using a non-paint application such as vinyl, as a non-limiting example. Still alternatively, the glass paint mixing surface may be left clear and attached with its rearward surface directly adjoining the opaque case. The adjoining surface of the case then has the desired color to provide the desired effect without the need for an extra coating, paint or otherwise.

The opaque glass paint mixing surface may in some embodiments of the Glass Mixing Palette and Magnetic Attachment be adhered to the lid of its case using a glue such as silicone. In such embodiments, an adhesive such as Dap® Dynaflex 230 elastomeric, available from DAP Products Inc., 2400 Boston Street Suite 200, Baltimore, Md. 21224, is applied to the side of the opaque glass paint mixing surface having the glazed or color backing. A thin coat of the adhesive may be applied to the entire surface, or only to the edges, thereby leaving no gaps for water to seep under the opaque glass paint mixing surface. The opaque glass paint mixing surface is then clamped to the interior lid of the closable palette box, case, or tin for two weeks. In alternate embodiments of the Glass Mixing Palette and Magnetic Attachment, the opaque glass paint mixing surface may be mechanically retained using a metal frame encasement. Alternately, a glazed porcelain or ceramic tile may be made to fit inside the lid of the closable palette box, case, or tin, which would allow for unique shaping and ridges.

In some embodiments, the Glass Mixing Palette and Magnetic Attachment may be provided with a magnetic attachment that allows it to be attached to one or more sheets of watercolor paper in a sketchbook or watercolor journal. The magnetic attachment may be a two piece magnet assembly, or may be a single piece magnetic clip assembly, in either case being provided with one or more magnets. The one or more magnets of the magnetic attachment may, for non-limiting example, be one or more neodymium magnets. Specifically, the one or more neodymium magnets could be utilized in conjunction with a ferromagnetic metal, or may be embodied as two attracting magnets. In a two piece magnet assembly embodiment, the magnetic attachment is in two pieces that allow the user to apply the loose magnet to the magnet attached to the palette, with one or more sheets of watercolor paper of the sketchbook or watercolor journal therebetween. In the single piece magnetic assembly embodiment, the magnetic attachment has a single piece magnetic clip assembly with both magnets attached to a piece of folding stock, so that the clip is closed over one or more sheets of watercolor paper of the sketchbook or watercolor journal, with the magnets holding the magnetic clip assembly in place.

The several embodiments herein are described for use with paints, but this is not to be construed as limiting the scope of the Glass Mixing Palette and Magnetic Attachment in any way, which may include embodiments that may be used for entirely different purposes, such as makeup for non-limiting example.

According to one embodiment of the invention, a Glass Mixing Palette and Magnetic Attachment includes a closable portable case and a glass paint mixing surface contained within the closable portable case. The glass paint mixing surface has a glazed or color backing.

According to another embodiment of the invention, a Glass Mixing Palette and Magnetic Attachment includes a glass paint mixing surface of a portable palette. The glass paint mixing surface, more specifically, is a shatter-resistant glass paint mixing surface having a glazed or color backing.

According to another embodiment of the invention, a method of manufacturing a Glass Mixing Palette and Magnetic Attachment includes several steps. The first step is providing a closable portable case. The second step is glazing or applying a color backing to a glass paint mixing surface. The third step is attaching the glass paint mixing surface to the interior of the closable portable case.

Embodiments of the Glass Mixing Palette and Magnetic Attachment may be used by dipping a wet paint brush in paint and applying it to the glass to make a puddle of color. Other colors may be added to the puddle so that the artist can clearly see what color he or she is making. The invention would be used primarily to mix watercolor or gouache paints, but would be applicable to oil and acrylic painting as well. The closable portable palette travels easily, so that artists may use the palette for plein air painting while having a more hands free experience. Alternately, artists may also use the palette in a studio where the magnetic attachment may be unnecessary. Embodiments of the palette may also be specifically built and used for ink applications, as the mixing surface and magnetic attachment would be useful for this and other possible art media applications.

Embodiments of the Glass Mixing Palette and Magnetic Attachment are ready upon manufacture for mixing paint with no preparation of the glass surface necessary to avoid beading, while providing a compact case for travel or studio painting. Embodiments of the Glass Mixing Palette and Magnetic Attachment provide magnetized palettes that may be fastened to the paper or notebook being painted on. The Neodymium magnetic attachment allows certain embodiments of the palette to strongly adhere to the sketchbook without damaging paper or falling off due to pressure from a paintbrush mixing colors. This allows the artist to balance the sketchbook and palette securely with one hand, leaving the other hand free to paint.

DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned and other features of embodiments of the Glass Mixing Palette and Magnetic Attachment, and the manner of their working, will become more apparent and will be better understood by reference to the following description of embodiments of the Glass Mixing Palette and Magnetic Attachment taken in conjunction with the accompanying drawings, wherein:

FIG. 1A is a top view of an embodiment of a Glass Mixing Palette and Magnetic Attachment in a closed position, as described herein;

FIG. 1B is a top left perspective view of the embodiment of a Glass Mixing Palette and Magnetic Attachment of FIG. 1A in an open position, as described herein;

FIG. 1C is a top view of the embodiment of a Glass Mixing Palette and Magnetic Attachment of FIGS. 1A and 1B in an open position, as described herein;

FIG. 2A is a front perspective view of another embodiment of a Glass Mixing Palette and Magnetic Attachment in a closed position, as described herein;

FIG. 2B is a top view of the embodiment of a Glass Mixing Palette and Magnetic Attachment of FIG. 2A in an open position, as described herein;

FIG. 2C is a top left perspective view of the embodiment of a Glass Mixing Palette and Magnetic Attachment of FIGS. 2A and 2B in an open position, as described herein;

Figure 3A:
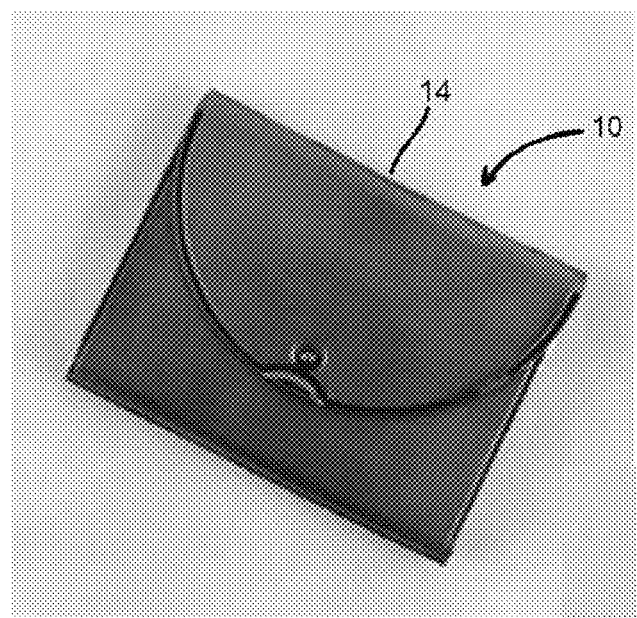
FIG. 3A is a top view of another embodiment of a Glass Mixing Palette and Magnetic Attachment in a closed position, as described herein.

Corresponding reference numbers indicate corresponding parts throughout the several views. The exemplifications set out herein illustrate embodiments of the Glass Mixing Palette and Magnetic Attachment, and such exemplifications are not to be construed as limiting the scope of the claims in any manner.

DETAILED DESCRIPTION

Referring now to FIGS. 1A, 1B, 1C, 2A, 2B, and 2C, an embodiment of a palette 10 of the Glass Mixing Palette and Magnetic Attachment is shown having a closable palette box, case, or tin 14 and an opaque glass paint mixing surface 16. The opaque glass paint mixing surface 16 is made from a shatter-resistant glass pane 20 having a glazed or color backing 26. The glazed or color backing 26 includes, for non-limiting example, an adhesion promoter, an application of color, an application of an opaque base coat, and an application of clear coat, applied in that order to the wrong or rough side of the opaque glass paint mixing surface 16, similar to the reflective coating of a mirror. The glazed or color backing 26 applied to the opaque glass paint mixing surface 16 provides an ideal surface for visualizing paint mediums.

Following application and curing of the glazed or color backing 26, the opaque glass paint mixing surface 16 is attached to a frame encasement or the interior lid 30 of the closable palette box, case, or tin 14, using Dap® Dynaflex 230 elastomeric 28, or an equivalent adhesive. The frame encasement or the interior lid 30 of the closable palette box, case, or tin 14 is provided with a lip 18 to prevent spillage of paint applied to the opaque glass paint mixing surface 16. The closable palette box, case, or tin 14 of the palette 10 is provided with a magnetic tray 40, to which metal paint pans 42 may be affixed.

As shown in FIG. 1C, when the palette 10 is in use, a watercolor, oil paint, or acrylic paint smear or puddle 82 may be applied to the opaque glass paint mixing surface 16. This is accomplished by wetting a brush, dabbing it in the appropriate metal paint pan 42, and smearing the paint on the opaque glass paint mixing surface 16. In order to lighten or darken the shade, the artist may choose to add more water or dilutent, or more paint, respectively, to the watercolor, oil paint, or acrylic paint smear or puddle 82. One of the metal paint pans 42 may contain water, transparent watercolor, or other dilutent for this purpose. When configured for use with watercolor, oil paint, or acrylic paint, the glazed or color backing 26 may be white in color. In this way, the opaque (white) glass paint mixing surface 16 allows for the visualization of paint on watercolor paper (which is traditionally white) so the artist can gauge how much "white of the paper" will show through the paint.

As shown in FIG. 2B, a gouache smear or puddle 84 may alternatively be applied to the opaque glass paint mixing surface 16. A metal paint pan 42 may contain, for non-limiting example, titanium white gouache for this purpose. Specifically, gouache is an opaque paint that has properties similar to watercolor. A grey colored opaque glass mixing surface 16 is ideal for clearly seeing if the gouache paint to water mixture is too thin. Moreover, gouache behaves in ways similar to acrylic or oil paints as light colors (even white) can be applied over dark colors and maintain their distinct color. This is different than watercolor, as watercolor, being transparent, must preserve the white of the paper and paint from light to dark. If an artist adds white watercolor paint over watercolor paper or over any color, it really cannot be seen at all. In this medium, therefore, white gouache is used to lighten colors.

Titanium white gouache, therefore, is easier to visualize when smeared on an opaque glass paint mixing surface 16 having a grey glazed or color backing 26, than when smeared on an opaque glass paint mixing surface 16 having a white glazed or color backing. When configured for use with gouache, therefore, the glazed or color backing 26 of the opaque glass paint mixing surface 16 may be grey in color. Alternatively, a combination of white and grey glazed or color backing areas 26 may be applied to the wrong or rough side of the opaque glass paint mixing surface 16 for use with mixed media paints.

Figure 3B:
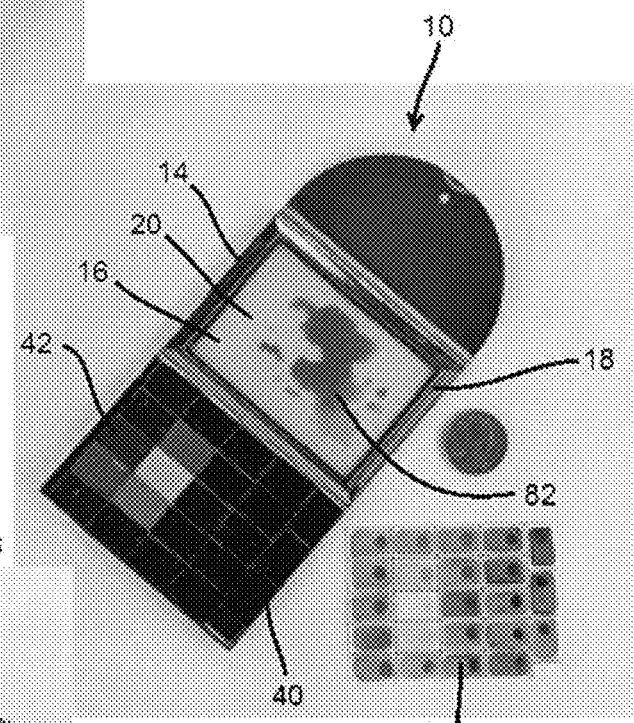
FIG. 3B is a top view of the embodiment of a Glass Mixing Palette and Magnetic Attachment of FIG. 3A in an open position, as described herein.
Figure 3C:
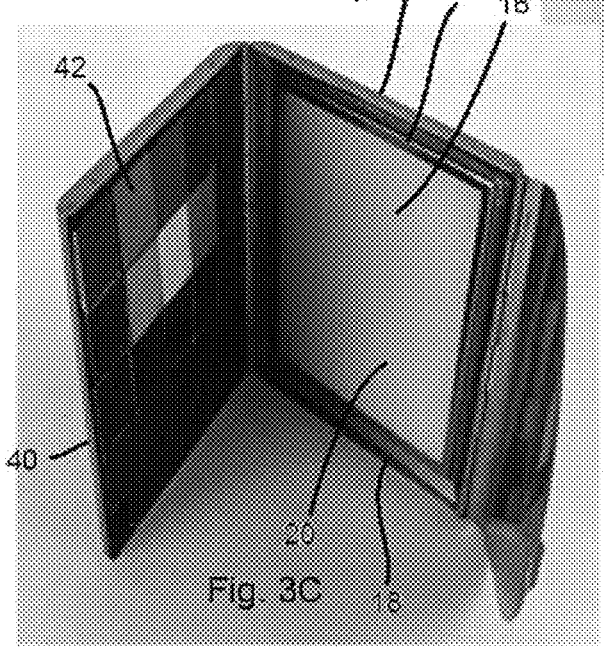
FIG. 3C is a top front perspective view of the embodiment of a Glass Mixing Palette and Magnetic Attachment of FIGS. 3A and 3B in an open position, as described herein.
Figure 4A:
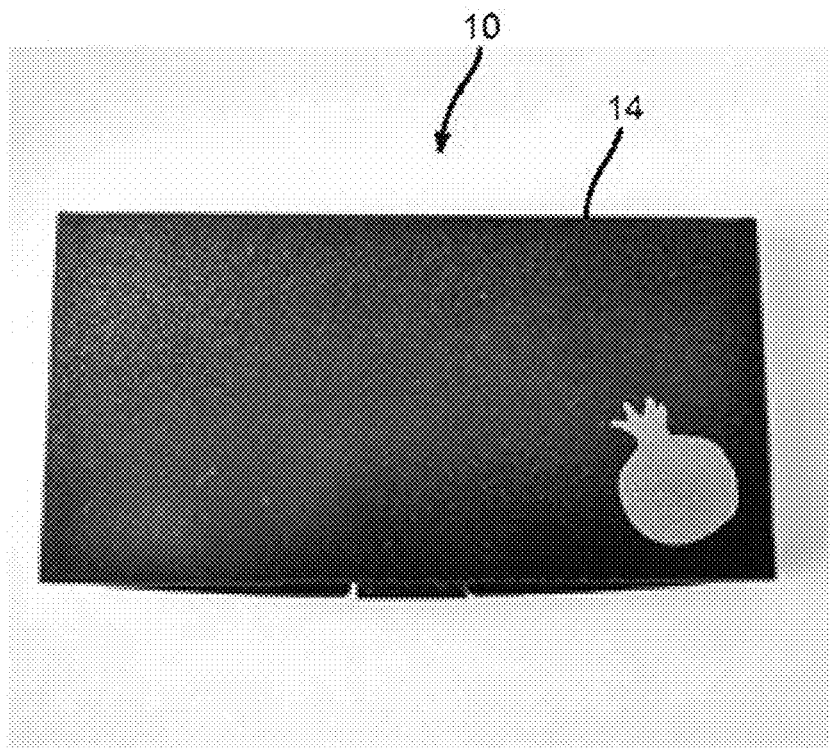
FIG. 4A is a top view of another embodiment of a Glass Mixing Palette and Magnetic Attachment in a closed position, as described herein.
Figure 4B:
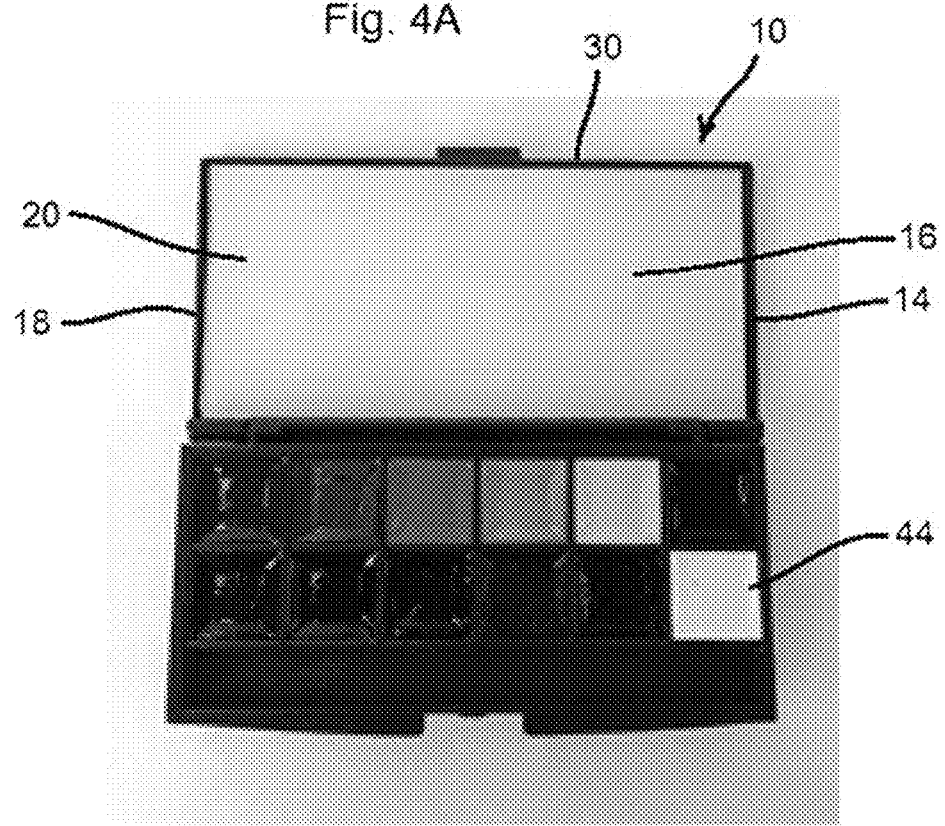
FIG. 4B is a top view of the embodiment of a Glass Mixing Palette and Magnetic Attachment of FIG. 4A in an open position, as described herein.
Figure 5A:
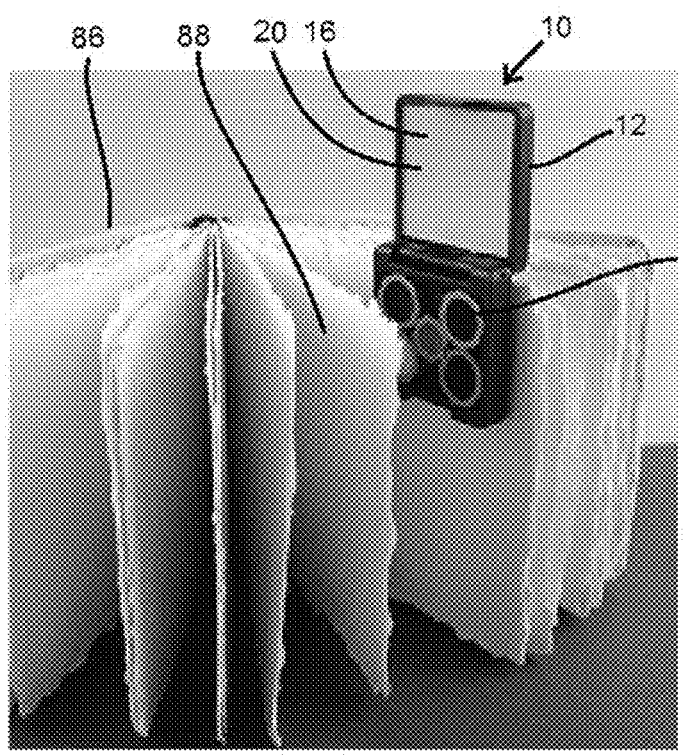
FIG. 5A is a front perspective view of another embodiment of a Glass Mixing Palette and Magnetic Attachment in an open position and attached to a sketchbook or watercolor journal, as described herein.
Figure 5C:
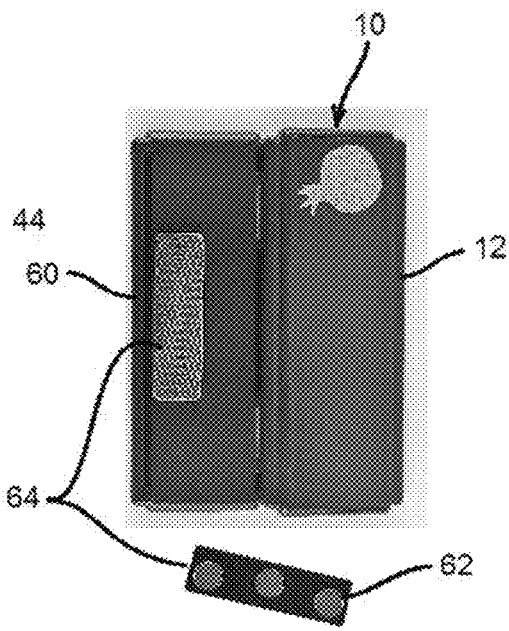
FIG. 5C is a bottom view of the embodiment of a Glass Mixing Palette and Magnetic Attachment of FIG. 5B in an open position, as described herein.
Figure 5B:
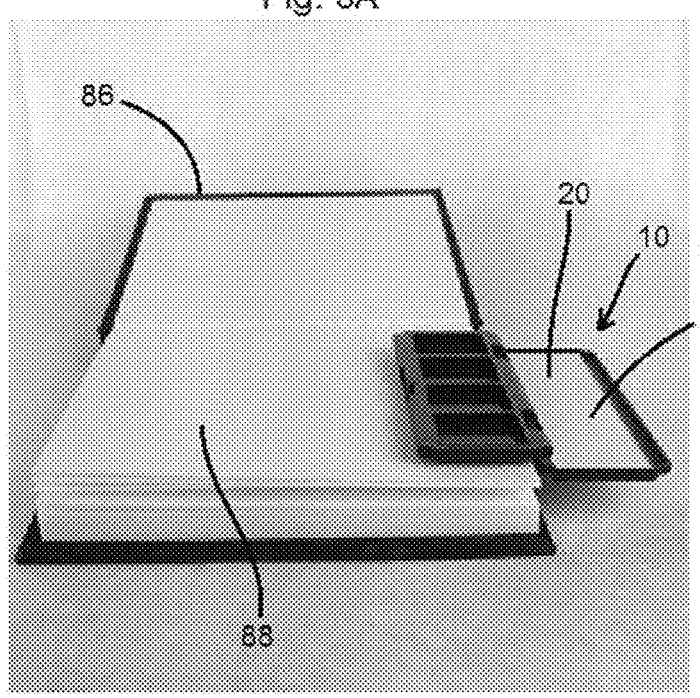
FIG. 5B is a top right perspective view of another embodiment of a Glass Mixing Palette and Magnetic Attachment in an open position and attached to a sketchbook or watercolor journal, as described herein.
Figure 5D:
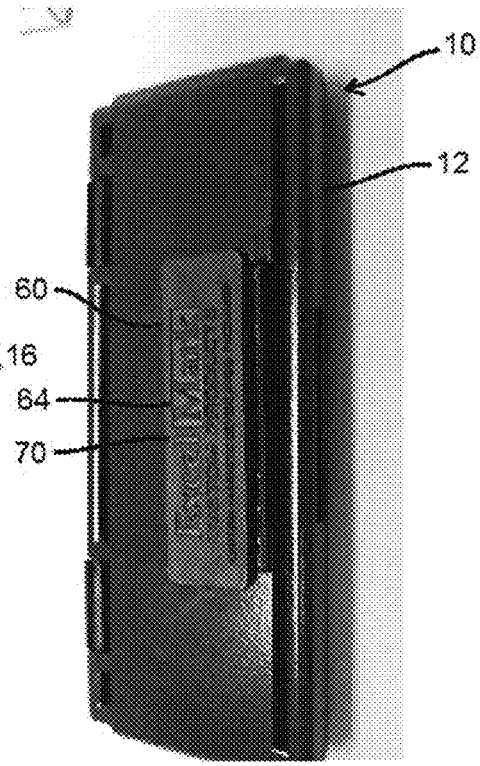
FIG. 5D is a bottom front perspective view of the embodiment of a Glass Mixing Palette and Magnetic Attachment of FIGS. 5B and 5C in an open position, as described herein.
Figure 6A:
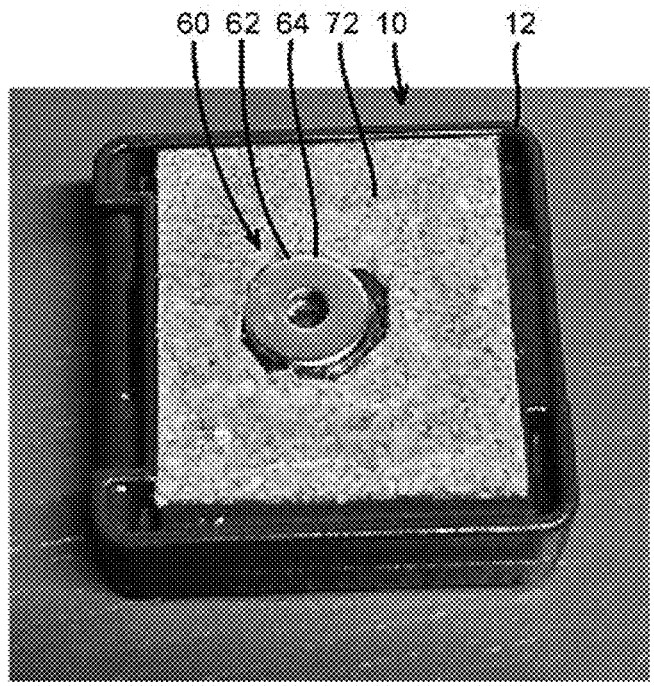
FIG. 6A is a bottom right perspective view of another embodiment of a Glass Mixing Palette and Magnetic Attachment, as described herein.
Figure 6B:
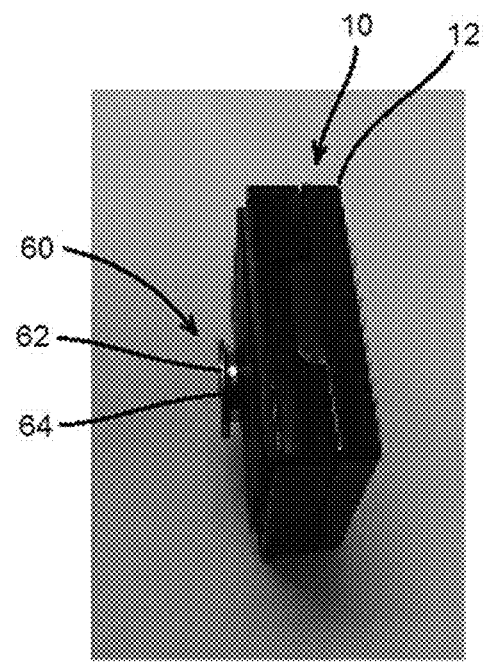
FIG. 6B is a bottom right front perspective view of the embodiment of a Glass Mixing Palette and Magnetic Attachment of FIG. 6A, as described herein.
Figure 7A:
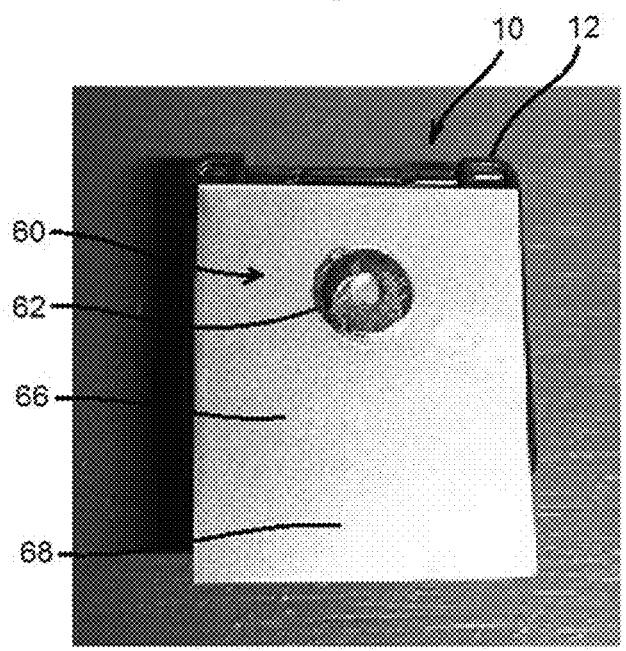
FIG. 7A is a bottom view of another embodiment of a Glass Mixing Palette and Magnetic Attachment, as described herein.
Figure 7B:
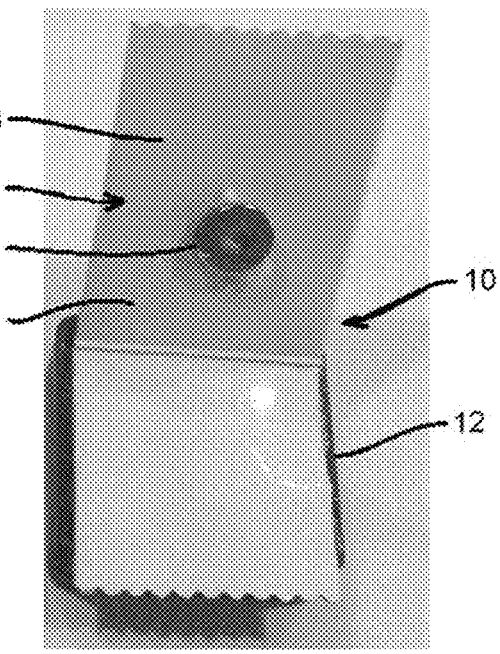
FIG. 7B is a bottom view of the embodiment of a Glass Mixing Palette and Magnetic Attachment of FIG. 7A, as described herein.

Turning now to FIGS. 3A, 3B, 3C, 4A, and 4B, alternative embodiments of the palette 10 are shown. As can be seen, the palette 10 having an opaque glass paint mixing surface 16 may take the form of any of a variety of closable palette boxes, cases, or tins 14 having a frame encasement and/or lid 30. As shown in FIGS. 3A, 3B, and 3C, the shatter-resistant glass pane 20 is retained to the closable palette box, case, or tin 14 by way of the frame encasement 30, so that no adhesive is required to affix the opaque glass paint mixing surface 16 to the palette box, case, or tin 14. A lip 18 again keeps the paint from spilling from the opaque glass paint mixing surface 16. Metal paint pans 42 are again attached to a magnetic tray 40. In this example, a watercolor, oil paint, or acrylic paint smear or puddle 82 is shown applied to the opaque glass paint mixing surface 16, which has white glazed or color backing. As shown in FIGS. 4A and 4B, the palette 10 is provided with molded paint pans 44 in place of the metal paint pans 42 and magnetic tray 40.

Turning now to FIGS. 5A, 5B, 5C, 5D, 6A, 6B, 7A, and 7B, the palette 10 of the Glass Mixing Palette and Magnetic Attachment is shown in alternative embodiments as a bookmark palette 12. The bookmark palette 12 is again shown having an opaque glass paint mixing surface 16 made from a shatter-resistant glass pane 20 having a glazed or color backing. Molded paint pans 44 or a magnetic tray 40 (not shown) having metal paint pans 42 (not shown) are again provided. As before, the glazed or color backing 26 of the opaque glass paint mixing surface 16 may be white for use with watercolor, oil paint, or acrylic paint, or gray for use with gouache, or a combination thereof.

In the bookmark palette 12 embodiment, a magnetic attachment assembly 60 allows the bookmark palette 12 to be attached, for non-limiting example, to the watercolor paper pages 86 of a sketchbook or watercolor journal 88. Specifically, watercolor paper is very thick. The bookmark palette 12 can be clipped onto two to three watercolor paper pages 86 of the sketchbook or watercolor journal 88, which provides a strong enough hold for hands free mixing and painting. That is to say that the artist does not have to hold the palette 10 in his or her hand or use a table surface.

To facilitate this, the magnetic attachment assembly 60 uses neodymium magnets 62, either in a two piece magnet assembly 64 configuration, or in a single piece magnetic clip assembly 66 configuration. In the two piece magnet assembly 64 configuration, one neodymium magnet 62 is attached to the bookmark palette 12, and the other neodymium magnet 62 is manually placed on the backside of the one or more watercolor paper pages 86. In some two piece magnet assembly 64 configurations, a magnet carrier 70 may be used in place of the single loose neodymium magnet 62, and may be provided with one or more neodymium magnets 62. In the single piece magnetic clip assembly 66 configuration, the second neodymium magnet 62 is attached to a piece of folding stock 68, in order to minimize loose pieces. The folding stock 68 may be made from waterproof plastic for durability. The bookmark palette 12 may be provided with a cork or rubber backing 72, in order to minimize slippage.

Figure 8A:
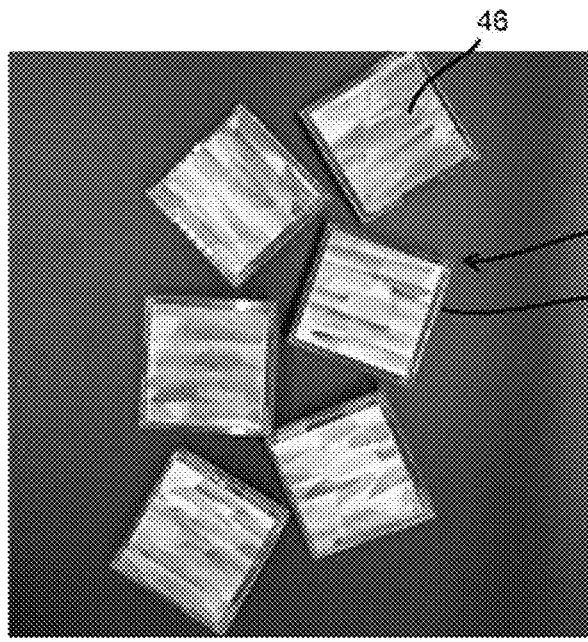
FIG. 8A is a top view of several examples of another embodiment of a Glass Mixing Palette and Magnetic Attachment, as described herein.
Figure 8B:
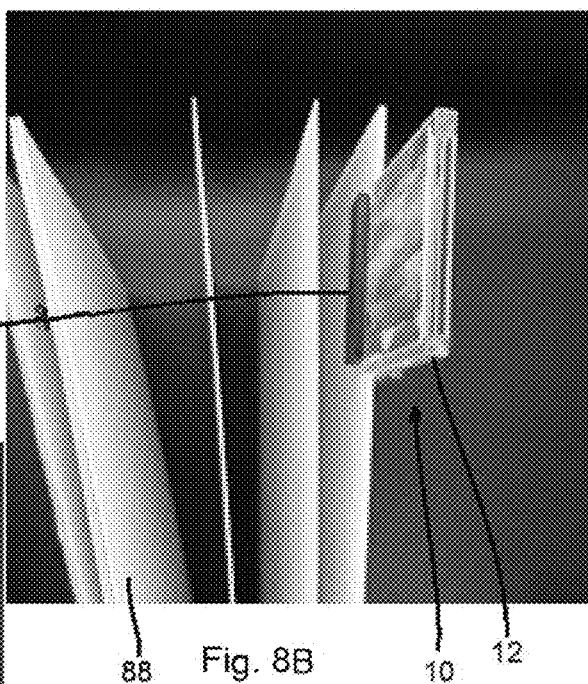
FIG. 8B is a front perspective view of one of the examples of the embodiment of a Glass Mixing Palette and Magnetic Attachment of FIG. 8A attached to a sketchbook or watercolor journal, as described herein.
Figure 8C:
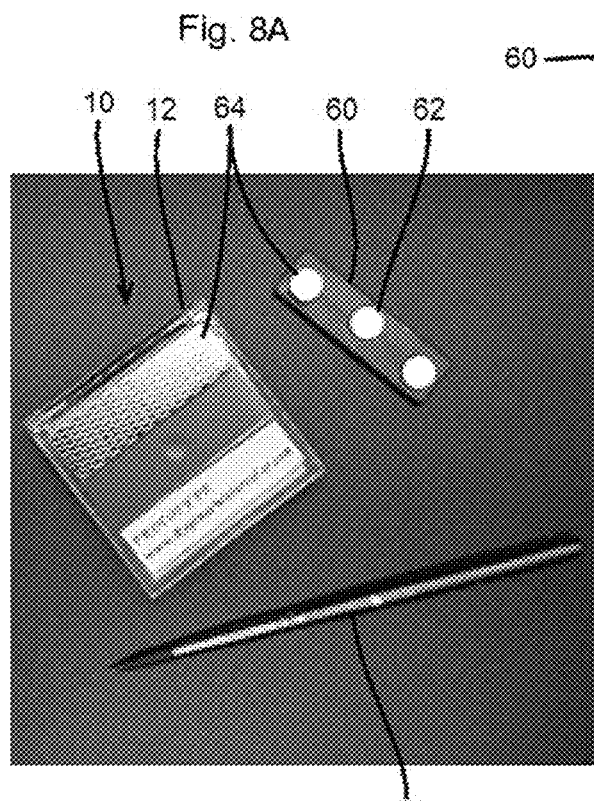
FIG. 8C is a bottom view of one of the examples of the embodiment of a Glass Mixing Palette and Magnetic Attachment of FIGS. 8A and 8B, as described herein.

Turning now to FIGS. 8A, 8B, and 8C, an alternative embodiment of the palette 10 of the Glass Mixing Palette and Magnetic Attachment is shown, again as a bookmark palette 12. The bookmark palette 12 is again provided with a magnetic attachment assembly 60 in the form of a two piece magnet assembly 64 using neodymium magnets 62, by way of which the bookmark palette 12 may be attached to the watercolor paper pages 86 of a sketchbook or watercolor journal 88. In the embodiment of the bookmark palette 12 shown in FIGS. 8A, 8B, and 8C, Yupo® paper 46 available from the Yupo Corporation America, 800 Yupo Court, Chesapeake, Va. 23320, is used in place of the magnetic tray 40, metal paint pans 42, or molded paint pans 44. Yupo® paper 46 allows the artist to create the needed watercolor, oil paint, or acrylic paint smear or puddle or gouache smear or puddle without the opaque glass paint mixing surface 16. Paint brush 80 is shown for reference.

Figure 9A:
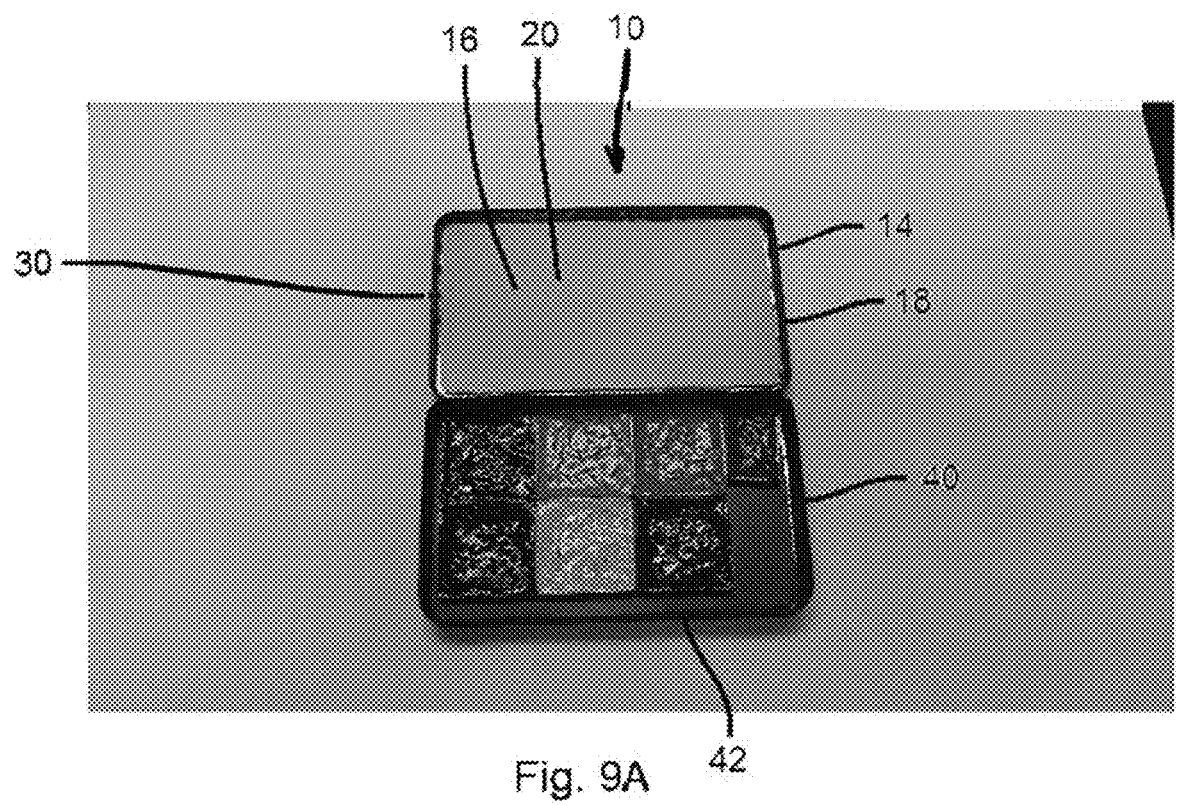
FIG. 9A is a top view of another embodiment of a Glass Mixing Palette and Magnetic Attachment in an open position, as described herein.
Figure 9B:
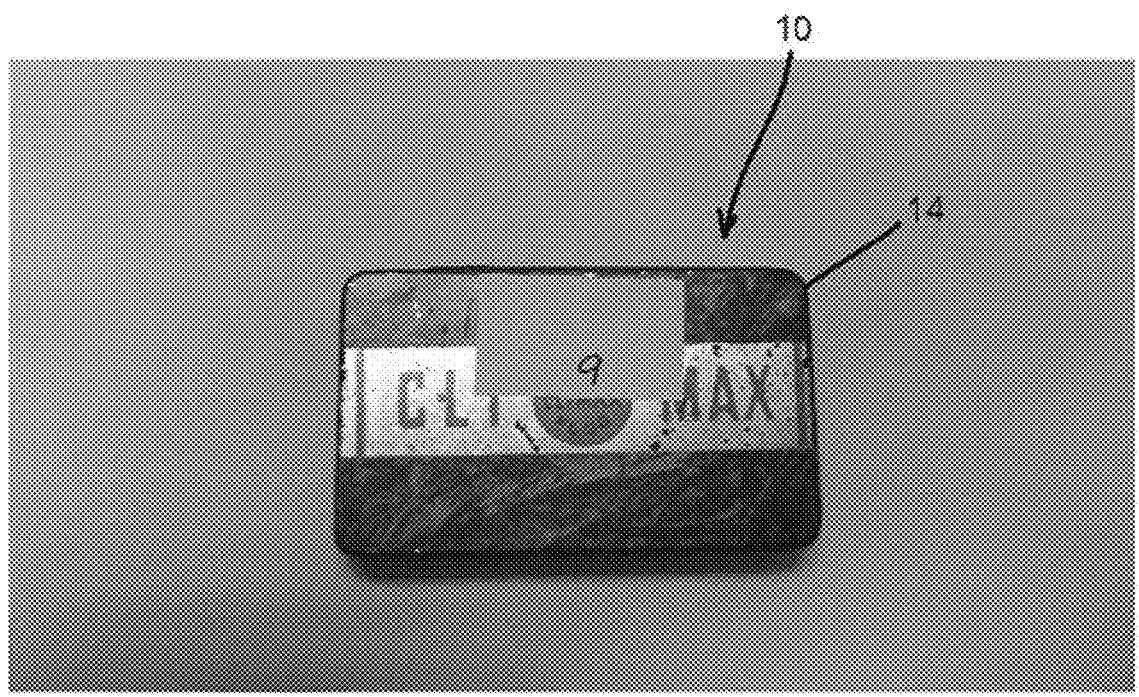
FIG. 9B is a top view of the embodiment of a Glass Mixing Palette and Magnetic Attachment of FIG. 9A in a closed position, as described herein.

Turning now to FIGS. 9A and 9B, another alternative embodiment of the palette 10 of the Glass Mixing Palette and Magnetic Attachment is shown. In this embodiment, the shatter-resistant glass pane 20 of the opaque glass paint mixing surface 16 is retained in a closable tin 14 by way of a retaining feature such as a ridge in the frame encasement or interior lid 30, so that no adhesive is required. A lip 18 again prevents paint from spilling from the opaque glass paint mixing surface 16. A magnetic tray 40 is again provided for metal paint pans 42.

Figure 10:
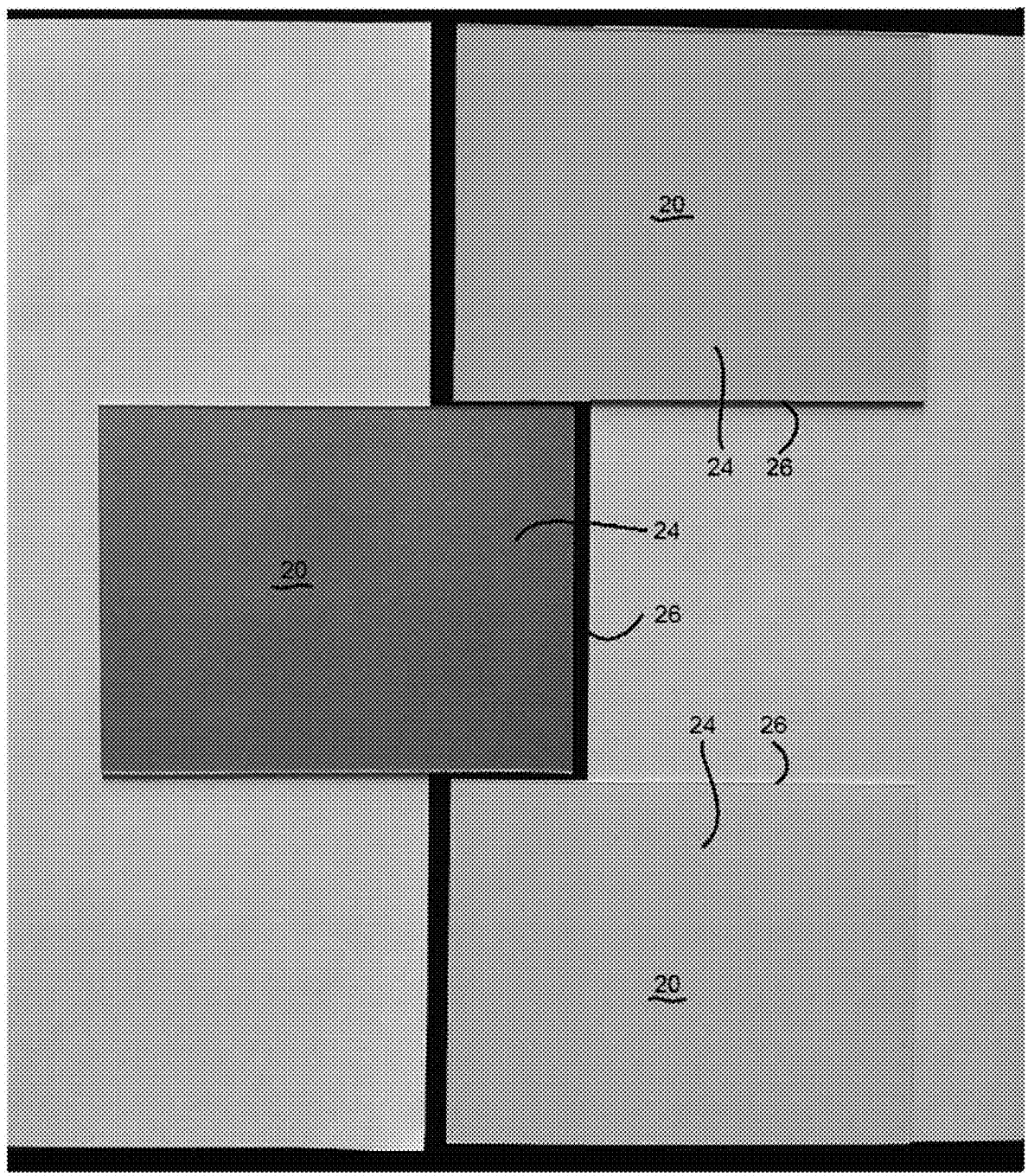
FIG. 10 is a top view of examples of glass paint mixing surfaces of embodiments of a Glass Mixing Palette and Magnetic Attachment, as described herein.

Turning now to FIG. 10, several examples of shatter-resistant glass panes 20 being prepared for use as opaque glass paint mixing surfaces of Glass Mixing Palette and Magnetic Attachments are shown. The several examples of the shatter-resistant glass panes 20 are shown right or smooth side 24 up. The upper right shatter-resistant glass pane 20 has received a white glazed or color backing 26 on the wrong or rough side (i.e.—the back side) of the shatter-resistant glass panes 20, along with an opaque base coat. The white glazed or color backing 26 along with the opaque base coat provides sufficient opacity that no contrasting surfaces from beneath the shatter-resistant glass pane 20 bleeds through. (Best illustrated by color drawings, which will be provided by the Office upon request and payment of the necessary fee.) The middle left shatter-resistant glass panes 20 has received a silver glazed or color backing 26 on the wrong or rough side (i.e.—the back side) of the shatter-resistant glass panes 20. The silver glazed or color backing 26 is dense enough so that a base coat was not requires, while still providing sufficient opacity that no contrasting surfaces from beneath the shatter-resistant glass pane 20 bleeds through. Neutral flat grey may also be used effectively to ensure that no contrasting surfaces from beneath the shatter-resistant glass pane 20 bleeds through.

The lower right shatter-resistant glass panes 20 has received a white glazed or color backing 26 on the wrong or rough side (i.e.—the back side) of the shatter-resistant glass panes 20, but has received no opaque base coat. The white glazed or color backing 26 without the opaque base coat does not provide sufficient opacity, such that contrasting surfaces from beneath the shatter-resistant glass pane 20 bleed through and contrasting edges may be seen. (Best illustrated by color drawings, which will be provided by the Office upon request and payment of the necessary fee.) Therefore, white automotive paint requires a base coat when used as the glazed or color backing 26, to prevent shadows or unevenness showing through when the shatter-resistant glass pane 20 is glued to the palette 10.

Figure 11:
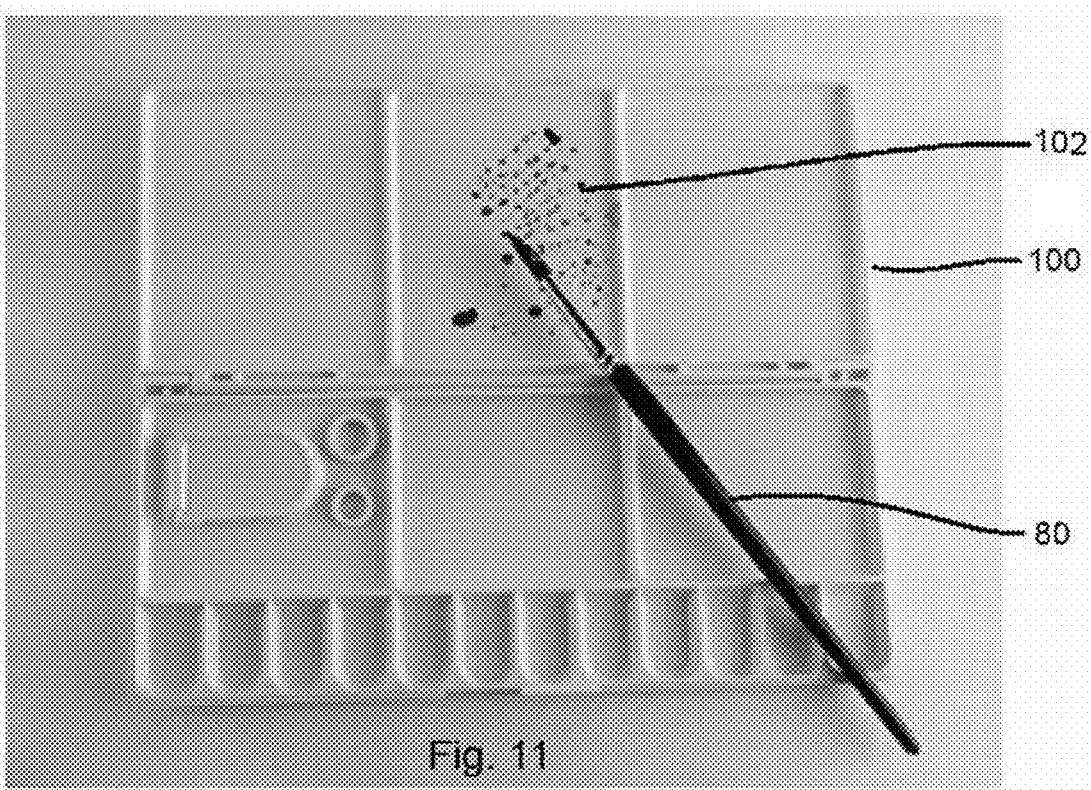
FIG. 11 is a top view of a prior art mixing palette in an open position.
Figure 12:
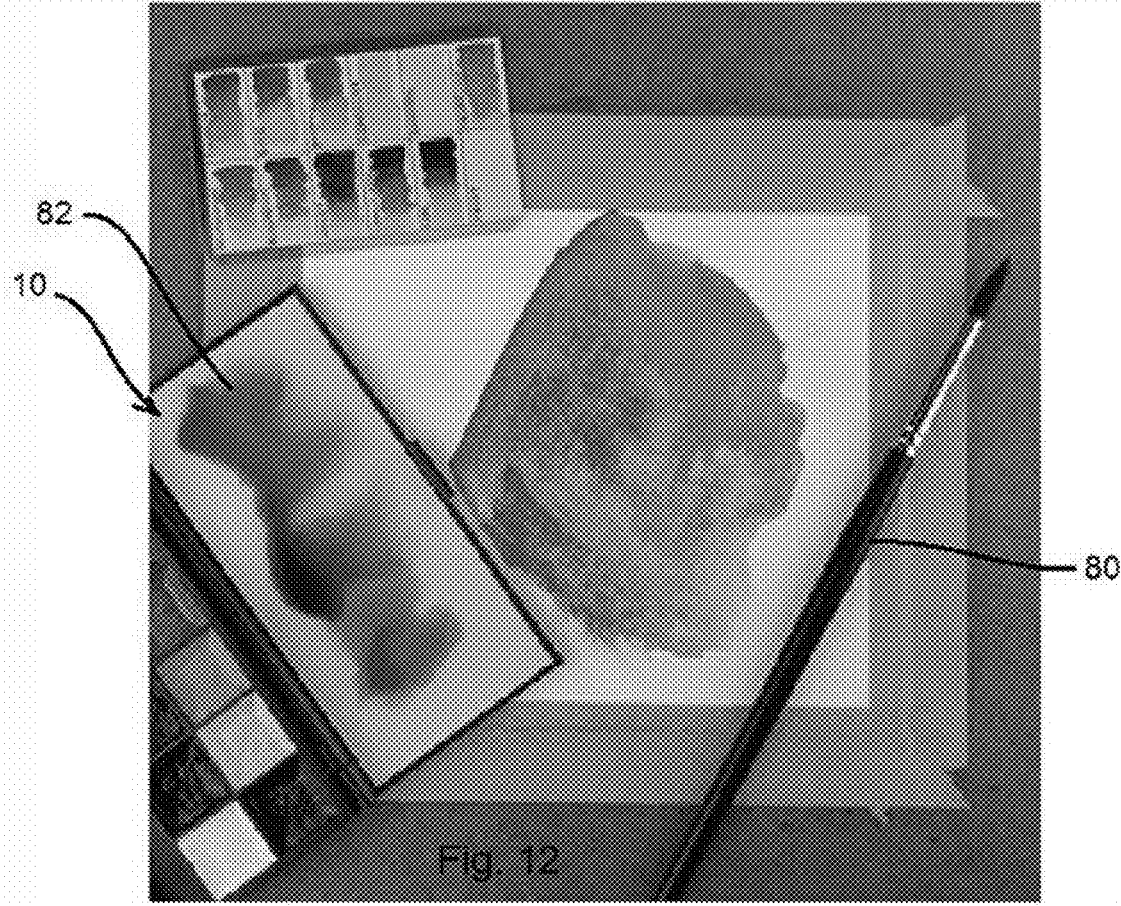
FIG. 12 is a top view of the embodiment of a Glass Mixing Palette and Magnetic Attachment of FIGS. 4A and 4B in an open position, as described herein.

Turning now to FIGS. 11 and 12, a comparison is shown between a prior art palette 100 as shown in FIG. 11, and a palette 10 of an embodiment of the Glass Mixing Palette and Magnetic Attachments of the present disclosure as shown in FIG. 12. On the palette 100 of the prior art as shown in FIG. 11, a paint brush 80 has been used to apply a paint smear 102 to the palette mixing surface. However, the paint 102 has beaded, so that the artist cannot visualize the color mix that may or may not have been produced. On the palette 10 of the embodiment of the Glass Mixing Palette and Magnetic Attachments of the present disclosure as shown in FIG. 12, a proper watercolor, oil paint, or acrylic paint smear or puddle 82 has been produced using the paint brush 80. As may be seen, a gradient of mixed colors has been produced, so that the artist may choose from them the exact desired color for painting. (Best illustrated by color drawings, which will be provided by the Office upon request and payment of the necessary fee.)

While the Glass Mixing Palette and Magnetic Attachment has been described with respect to at least one embodiment, the Glass Mixing Palette and Magnetic Attachment can be further modified within the spirit and scope of this disclosure, as demonstrated previously. This application is therefore intended to cover any variations, uses, or adaptations of the Glass Mixing Palette and Magnetic Attachment using its general principles. Further, this application is intended to cover such departures from the present disclosure as come within known or customary practice in the art to which the disclosure pertains and which fall within the limits of the appended claims.

REFERENCE NUMBER LISTING

10 Palette
12 Bookmark palette
14 Closable palette box, case, or tin
16 Opaque glass paint mixing surface
18 Lip
20 Shatter-resistant glass pane
22 Wrong or rough side
24 Right or smoot side
26 Glazed or color backing
28 Dap® Dynaflex 230 elastomeric
30 Frame encasement or interior lid
40 Magnetic tray
42 Metal paint pans
44 Molded paint pans
46 Yupo® paper
60 Magnetic attachment assembly
62 Neodymium magnets
64 Two piece magnet assembly
66 Single piece magnetic clip assembly
68 Folding stock
70 Magnet carrier
72 Cork or rubber backing
80 Paint brush
82 Watercolor, oil paint, or acrylic paint smear or puddle
84 Gouache smear or puddle
86 Watercolor paper pages
88 Sketchbook or watercolor journal
100 Prior art palette
102 Beaded paint

What is claimed is:

1. A palette, comprising:
a closable portable case; and
a glass paint mixing surface contained within the closable portable case, the glass paint mixing surface having a glazed or color backing, wherein:
the glazed or color backing further comprises an adhesion promoter, a color application, an opaque base coat application, and a clear coat application, and wherein:
the glass paint mixing surface having a rough side and a smooth side; and
the glazed or color backing being applied to the rough side.

2. The palette of claim 1, wherein:
the color application of the glazed or color backing being one of white, silver, and gray.

3. The palette of claim 1, wherein:
the glass paint mixing surface further comprises shatter-resistant glass.

4. The palette of claim 3, wherein:
the glass paint mixing surface being attached to the closable portable case using a frame encasement.

5. The palette of claim 3, wherein:
the glass paint mixing surface being attached to the closable portable case using silicone adhesive.

6. The palette of claim 1, further comprising:
a magnetic attachment connected to the closable portable case, the magnetic attachment being one of a two piece magnet assembly and a single piece magnetic clip assembly.

7. The palette of claim 1, further comprising:
at least one paint pan connected to the closable portable case, the at least one paint pan further comprising one of a magnetic tray and at least one metal paint pan, and at least one molded paint pan.

8. A glass paint mixing surface of a portable palette, comprising:
a shatter-resistant glass paint mixing surface having a glazed or color backing, wherein:
the glazed or color backing further comprises an adhesion promoter, a color application, an opaque base coat application, and a clear coat application, and wherein:
the shatter-resistant glass paint mixing surface having a rough side and a smooth side; and
the glazed or color backing being applied to the rough side.

9. The glass paint mixing surface of claim 8, wherein:
the rough side and the smooth side being determined using a smear test.

10. The glass paint mixing surface of claim 8, wherein:
the color application of the glazed or color backing being one of white, silver, and gray.

11. A method of manufacturing a palette, comprising:
providing a closable portable case;
glazing or applying a color backing to a glass paint mixing surface; and attaching the glass paint mixing surface to the interior of the closable portable case, wherein:

the glazing or color backing further comprises an adhesion promoter, a color application, an opaque base coat application, and a clear coat application, applied in that order, and further comprising the steps of:

determining a rough side and a smooth side of the glass paint mixing surface using a smear test; and applying the glazing or color backing to the rough side.

12. The method of claim 11, wherein:

the color application of the glazing or color backing being one of white, silver, and gray.

13. The method of claim 11, wherein:

the glass paint mixing surface further comprises shatter-resistant glass.

14. The method of claim 11, further comprising the step of:

attaching the glass paint mixing surface to the closable portable case using a silicone adhesive and a frame encasement.

15. The method of claim 11, further comprising at least one of the steps of:

connecting a magnetic attachment to the closable portable case, the magnetic attachment being one of a two piece magnet assembly and a single piece magnetic clip assembly; and connecting at least one paint pan to the closable portable case, the at least one paint pan further comprising one of a magnetic tray and at least one metal paint pan, and at least one molded paint pan.

\* \* \* \* \*